(12) United States Patent
Robins

(10) Patent No.: US 11,928,675 B2
(45) Date of Patent: *Mar. 12, 2024

(54) SYSTEM AND METHOD USING ZERO KNOWLEDGE PROOFS FOR ALERT SHARING

(71) Applicant: Nice Ltd., Ra'anana (IL)

(72) Inventor: Simon Robins, Haifa (IL)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,369

(22) Filed: Sep. 23, 2022

(65) Prior Publication Data

US 2023/0014318 A1 Jan. 19, 2023

Related U.S. Application Data

(63) Continuation of application No. 16/801,738, filed on Feb. 26, 2020, now Pat. No. 11,514,439.

(51) Int. Cl.
*G06Q 20/38* (2012.01)
*H04L 9/06* (2006.01)
(Continued)

(52) U.S. Cl.
CPC ....... *G06Q 20/3827* (2013.01); *G06Q 20/389* (2013.01); *H04L 9/0637* (2013.01);
(Continued)

(58) Field of Classification Search
CPC ............. G06Q 20/3827; G06Q 20/389; G06Q 20/4016; G06Q 20/383; G06Q 20/401;
(Continued)

(56) References Cited

U.S. PATENT DOCUMENTS 8,411,854 B2 4/2013 Grzonkowski et al.
10,721,060 B1 * 7/2020 Kaizer ................. H04L 63/123
(Continued)

FOREIGN PATENT DOCUMENTS

JP 2021001991 1/2021
JP 2021001991 A * 1/2021
(Continued)

OTHER PUBLICATIONS

Eberhardt et al. ("ZoKrates—Scalable Privacy-Preserving Off-Chain Computations", 2018 IEEE International Conference on Internet of Things (IThings), IEEE, 2018, pp. 1084-1091 (Year: 2018).*
(Continued)

*Primary Examiner* — James D Nigh
(74) *Attorney, Agent, or Firm* — PEARL COHEN ZEDEK LATZER BARATZ LLP

(57) ABSTRACT

Securely sharing proof of knowledge of information without revealing the information, for example to allow an institution to prove it has knowledge regarding an alert. Code or software may be generated (at a first computer system) which takes as input one or more details regarding an entity and returns a value based on a match to one or more actual details regarding the entity. A name may be generated for the code based on information describing the entity, and the code may be published to a blockchain, along with at least one key corresponding to the code. For each name an entry may be creating in an index, converting the name to a blockchain address. A proof based on the code may be generated at a second computer system, which, if verified, results in the first institution and the second institution sharing information regarding the entity.

26 Claims, 6 Drawing Sheets

(51) Int. Cl.
*H04L 9/32* (2006.01)
*G06Q 20/40* (2012.01)
*H04L 9/00* (2022.01)

(52) U.S. Cl.
CPC ....... H04L 9/0643 (2013.01); *G06Q 20/4016* (2013.01); *H04L 9/3218* (2013.01); *H04L 9/50* (2022.05); *H04L 2209/56* (2013.01)

(58) Field of Classification Search
CPC ... G06Q 20/405; H04L 9/0637; H04L 9/0643; H04L 9/3218; H04L 9/50; H04L 9/3239; H04L 2209/56
See application file for complete search history.

(56) References Cited

U.S. PATENT DOCUMENTS

| | | | | |
|---|---|---|---|---|
| 11,276,056 | B2 * | 3/2022 | Snow | G06Q 20/0658 |
| 11,323,243 | B2 * | 5/2022 | Hu | H04L 9/3239 |
| 11,323,489 | B1 * | 5/2022 | Panwar | H04L 63/0428 |
| 2021/0019746 | A1 * | 1/2021 | Adjaz | G06Q 20/34 |
| 2021/0044428 | A1 * | 2/2021 | Hwang | H04L 9/0643 |
| 2021/0119785 | A1 * | 4/2021 | Ben-Reuven | H04L 9/3239 |
| 2021/0218720 | A1 * | 7/2021 | Oberhauser | H04L 9/3239 |

FOREIGN PATENT DOCUMENTS

| | | | | |
|---|---|---|---|---|
| JP | 2021077941 | | 5/2021 | |
| JP | 2021077941 | A * | 5/2021 | ........... H04L 9/3221 |
| KR | 20210086433 | | 7/2021 | |
| KR | 20210086433 | A * | 7/2021 | |
| WO | WO-2021090764 | | 5/2021 | |
| WO | WO-2021090764 | A1 * | 5/2021 | ........... H04L 9/3221 |

OTHER PUBLICATIONS

Sweeney ("Simple Demographics Often Identify People Uniquely", Carnegie Mellon University, Data Privacy Working Paper 3. Pittsburgh, 2000, 34 pages) (Year: 2000).*

English translation of KR 20210086433 A (Year: 2020).*
English translation of WO 2021090764 A1 (Year: 2020).*
English translation of JP 2021077941 A (Year: 2019).*
English translation of JP 2021001991 A (Year: 2019).*
Bayardo et al., "Data privacy through optimal k-anonymization", 21st International conference on data engineering (ICDE'05), IEEE, 2005, pp. 217-228.
Ben-Or et al., "Multi-Prover Interactive Proofs: How to Remove Intractability Assumptions", STOC '88: Proceedings of the twentieth annual ACM symposium on Theory of computing, Jan. 1988, pp. 113-131.
Blum et al., "Non-Interactive Zero Knowledge", Massachusetts Institute of Technology, Laboratory for Computer Science, May 27, 1990.
Eberhardt et al., "ZoKrates—Scalable Privacy-Preserving Off-Chain Computations", 2018 IEEE International Conference on Internet of Things (iThings) and IEEE Green Computing and Communications (GreenCom) and IEEE Cyber, Physical and Social Computing (CPSCom) and IEEE Smart Data (SmartData), IEEE, 2018, pp. 1084-1091.
Batya Kenig and Tamir Tassa, "Practical Approximation Algorithm for Optimal kAnonymity", Thesis paper submitted to the Open University of Israel, Department of Mathematics and Computer Science, Jun. 2009.
Maguire et al., "Could blockchain be the foundation of a viable KYC utility", 2018 KPMG International Cooperative.
KPMG International Cooperative publication retrieved from https://home.kpmg/xx/en/home/insights/2018/02/blockchain-kyc-utility-fs.html Dec. 16, 2019.
Luciano, Adam, "zk-SNARKs—A Realistic Zero-Knowledge Example and Deep Dive", Jun. 9, 2018, retrieved from https://medium.com/coinmonks/zk-snarks-a-realistic-zero-knowledgeexample-and-deep-dive-c5e6eaa7131c Dec. 16, 2019.
Morais et al., "Zero Knowledge Set Membership", Oct. 15, 2018.
Sweeney, Latanya, "Simple Demographics Often Identify People Uniquely", Carnegie Mellon University, Data Privacy Working Paper 3. Pittsburgh 2000.
ZoKrates website homepage retrieved from https://zokrates.github.io/ Dec. 16, 2019.

* cited by examiner

SYSTEM AND METHOD USING ZERO KNOWLEDGE PROOFS FOR ALERT SHARING

PRIOR APPLICATION DATA

The present application claims priority from prior U.S. application Ser. No. 16/801,738, entitled "SYSTEM AND METHOD USING ZERO KNOWLEDGE PROOFS FOR ALERT SHARING" filed on Feb. 26, 2020, incorporated by reference herein in its entirety.

FIELD OF THE INVENTION

The present invention relates generally to the use, generation and/or location of zero knowledge proofs for information sharing, for example sharing alerts between or across institutions.

BACKGROUND OF THE INVENTION

Institutions and computer systems using technology to process large amounts of data which should remain confidential or private to various extents, such as banks, may want to share knowledge or information about the data they process. For example, financial institution may want to share alert information which describes suspicious or fraudulent activity. The desire to share information may conflict with the need to keep certain data such as the identity of the parties related to alerts private.

For example, a financial institution may raise an internal alert or flag regarding a customer or entity, or a transaction related to the customer or entity, for example if the transaction is suspected of being fraudulent or related to money laundering or a violation of laws, or if the identity of the customer is suspect (e.g. there is a suspicion that the self-reported identity of the customer performing a transaction is not correct). The institution would like to share such knowledge, for example that an alert has been raised against a certain entity, with other institutions. However, even publishing the name of the entity connected to the alert could constitute a breach of privacy. There is a problem of entity resolution—proving knowledge of and correctly identifying an entity or a record describing an entity also held by another institution—while still preserving the entity's privacy.

SUMMARY OF THE INVENTION

A system and method may allow securely sharing proof of knowledge of information (which may lead to entities securely sharing the information itself) without revealing the information. Code or software instructions may be generated (at a first computer system) which takes as input one or more details regarding an entity and returns a value, the value based on a match of input details to one or more actual details regarding the entity. A name may be generated for the code based at least in part on information describing the entity, and the code may be published to a blockchain, along with at least one key corresponding to the code. For each name an entry may be created in an index, converting the name to a blockchain address. A blockchain-based proof based on the code may be generated at a second computer system, which, if verified, results in the first institution and the second institution sharing information regarding the entity, for example information including or beyond what is already in the generated code or instructions.

Embodiments may improve transaction processing technology by providing a framework for privacy safeguarding while allowing knowledge sharing among institutions, leveraging zero knowledge proofs into a practical scheme. A human would not be able, as a practical matter, to perform such tasks, due at least to the advanced cryptography used.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
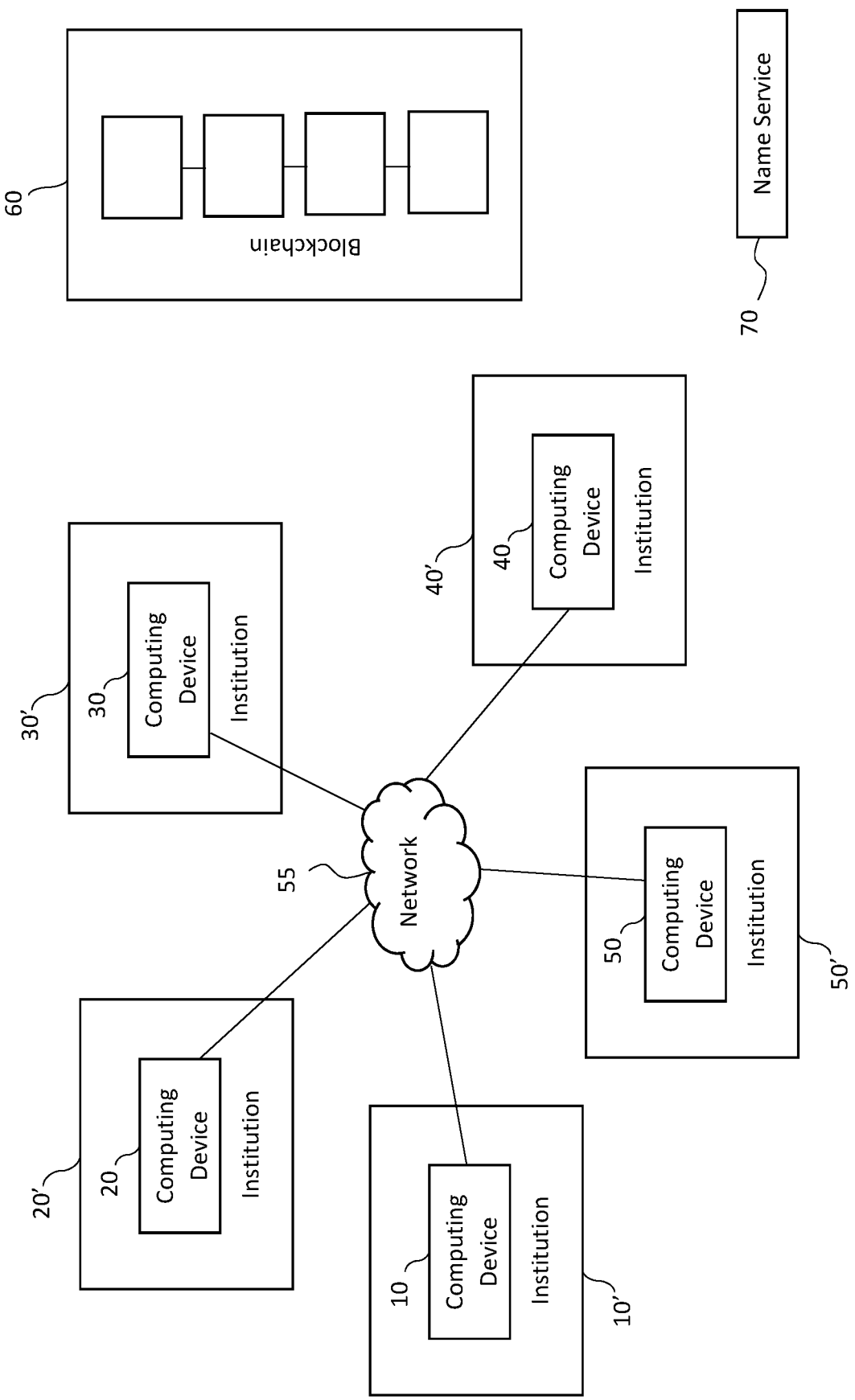
FIG. 1 shows a high level block diagram of an exemplary computing system according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may allow securely sharing knowledge of information without publicly revealing the information, or the identity of entities related to the information. Embodiments of the present invention may use a blockchain, typically privately operated (e.g. shared with and used only by certain institutions who wish to share certain knowledge), to publish or share alerts or other security notifications or flags raised by certain institutions as a contract represented by flattened code and also as a verification smart contract to the blockchain. A blockchain may use a dynamic or increasing list of records or blocks, that are linked using cryptography. For example, each block may contain information such as a cryptographic hash of the previous block, a timestamp, and data (for example represented as a Merkle tree or a Merkle Patricia Tree). The information shared to the blockchain according to some embodiments does not reveal or allow for the discovery of private or confidential information. Such private or confidential information may be for example the name of account holders or parties to a transaction, bank or other account numbers, identifying information for people such as addresses, social security numbers, tax identification numbers, or other government identification numbers, etc.

A first institution, after detecting or creating an alert or flag, and wishing to securely share that alert information, or to share that the institution has raised an alert based on an entity, without revealing the information, or the identity of the entity (e.g. an account holder) related to or underlying the alert, may create (e.g. via a computer system controlled by the institution) a relevant blockchain entry relevant to or describing that alert. When used herein, a party or institution performing an act may refer to a computer system operated by that party or institution performing computing steps as described herein. An alert or flag may be a warning that a certain individual, institution, or transaction is suspicious or potentially violates laws or regulations, exceeds certain parameters (e.g. has a higher currency amount than a threshold), may be committing fraud, may not be revealing their true identity, etc., and may refer both to the information describing such an alert or flag in general, and a data item or record describing such an alert or flag.

The first institution may, via its computer system, generate software instructions or code which takes as input one or more parameters or details (e.g. proposed parameters or details, which are to be checked against the actual details) regarding the entity underlying or related to the alert and which returns a value based on a match or equality to one or more actual details regarding the entity. The returned value may be for example true or false if a binary match is desired, or for example the number of details or parameters input to the code that match the details of the underlying entry (e.g. if birthday, ZIP code, account number, and last name are entered to the code, and birthday, account number, and last name match, "3" may be returned). In other embodiments a true/match may be returned if a number of parameters equal to a "match" integer parameter input to the code equal the actual parameters; and false/no match otherwise. The first institution, via its computer, may create or generate a name for the code or the data structure containing the code (and other items posted to the blockchain) based at least in part on, or including at least in part, information describing the entity. The name may be correlated via a lookup table or service to a location or second name to identify or find the item on the blockchain. The first institution may publish the code to the blockchain, and may publish a key corresponding to the code to the blockchain. The code may be stored on the blockchain as a contract or flattened code.

A second institution may wish to determine if there is an alert or other security notification or flag for a certain "suspected" person, entity or account, e.g. for which the second institution raises an alert. The second institution may search (e.g. via a second computer system controlled by the second institution) the blockchain for code or contracts that are possibly relevant to the person or entity. The search may use for example an index or name service which takes as input name data derived from some information or parameters associated with or describing the person or entity (e.g. in the same format of the name the first institution created) and converts the name to a blockchain name or location on the blockchain. For example, contracts on the blockchain may be divided into groups by the birthday or creation day or the relevant people or entities, and the second (e.g. searching) institution may use that date to search for and receive contracts relating to entities having that date. In some embodiments different or additional information may be used to search or divide into groups, and thus added to a name, such as the first letter of a last name.

The second institution may download (e.g. save locally at a computer system operated by the second institution) and then execute, e.g. locally by the computer system maintained by that institution, the relevant (e corresponding to details for the entity "suspected" by the second institution) published code or contracts returned. The second institution may then attempt to generate proofs based on the contracts locally (e.g. at a computer system private to that institution) and "offline" (e.g. not using the public computing power available to the blockchain participants). For any contract returning a positive result, or a match, e.g. a match that is positive or greater than a threshold number of attributes, the second institution may send proof or verification of, or based on, the relevant contract to the blockchain. The match or equality may be of details of the "suspected" entity to details of the entity underlying the code or contract. Such a match may indicate or cause a determination that the entity "suspected" by the second institution is the same as the entity as that underlying the alert generated by the first generation. In response to a match the second institution may generate a proof (e.g. based on the code downloaded from the blockchain) and publish the proof on the blockchain.

In response to a match the blockchain (e.g. certain nodes on the blockchain) may verify the proof (e.g. separate from a local verification by a proving institution), and if a positive verification occurs, the first institution, which created the alert, may be notified. If the blockchain does not verify the proof, the first institution is not notified of a positive verification. In response, the first and second institutions may cooperate regarding the alert, e.g. sharing information, blocking or flagging the relevant transactions or parties, etc.

An embodiment of the present invention may use the Ethereum platform, but other blockchain systems may be used. An embodiment may use the Succinct Non-interactive ARguments of Knowledge (zkSNARKs) zero-knowledge protocols. In some embodiments the ZoKrates toolbox may use zkSNARKs for operating zero knowledge proofs and generating and verifying proofs; such proofs may be verified in the Solidity language. Other languages, tools, and blockchain systems may be used.

Typically, the blockchain used is a "private" blockchain, in that the only institutions, nodes, and computing devices involved are ones using the blockchain to share information in a particular implementation, as opposed to computing systems in the wider world not associated with the particular implementation. In such an embodiment, all nodes on the private blockchain may execute the proofs, once saved or posted to the blockchain (typically with no monetary reward as in some blockchain systems, because it is in the interest of all parties to support the system), but in some embodiments not all nodes may execute the proofs. Embodiments of the present invention may allow the publishing institutions (e.g. an institution finding or creating an alert) to publish alert details as a zero-knowledge proof contract on a blockchain, the contract verifying based on being provided with correct identifying details. A confirming institution wanting to confirm the alert (e.g. a second institution wanting to know if the blockchain entry is relevant to a party or transaction processed by the second institution) may search for (typically using partial information not revealing private information identifying a party, e.g. a birthday only) and find, in the blockchain, the corresponding contract(s) and provide the correct details.

Contracts on the blockchain associated with alerts may meet two conditions: not revealing information and being easily found. No information should be revealed just by the fact that a contract based on the entity has been published to the blockchain. For example, simply using the entity name as the lookup key for looking up the entity may reveal that the entity was listed. Using a lookup scheme including a combination of information that may lead to the identification of the entity (for example, postal or ZIP+gender+date of birth) may also lead to unique identification of a large portion of the population. A correct balance may be found so that one lookup key or name (e.g. identifier for finding a blockchain record) will not return or hold too many records, which would require an institution checking many records until the correct one is found, making the scheme computationally expensive. One embodiment may bucket or bin contracts according to an attribute or combination of attributes. For example, in one implementation, contracts associated with alerts regarding entities that are people (as opposed to companies or accounts for example) can be identified via date of birth as a key. This would split the dataset into 365 or 366 per year multiplied by, e.g. 70+ years (e.g. 25,000+ buckets). Even with a blockchain holding millions of records, this may be sufficient to get reasonable granularity without divulging any personal information via the lookup key or naming convention.

Entities having an earlier date of birth (e.g. more than 70 years in the past) which may have a sparser occurrence, may have buckets formed over date ranges longer than a single day. This also may be a solution for smaller datasets that were sparser, for example having certain dates that only have one person in them, allowing for easy identification given minimal outside information. A contract address may be a unique address of a contract on a blockchain, for example a long hexadecimal string.

Typically, a name or lookup key (e.g. date of birth or name derived from or based on the date of birth) is mapped to or converted to a contract address by an index or process such as the Ethereum Name Service (ENS). In some embodiments, such as an embodiment using an ENS, a name registry or service may be distributed and may be maintained, stored, and executed by participating nodes (e.g. computers 10-50 in FIG. 1). For example, a name service may be implemented as contracts, stored on the blockchain, and executed by nodes, and may include a registry and resolvers. The registry may point to which resolver node can resolve any particular name.

Embodiments of the invention may improve systems communication technology by allowing different computer systems to efficiently communicate confidential information without revealing that information; and/or by providing an efficient method to search for such confidential information (e.g. by using a naming system as described herein) which does not in some embodiments identify the confidential information. Embodiments of the invention may improve blockchain technology by bucketing of contracts or proofs according to a common attribute of the underlying entity in order to ease location, while at the same time not revealing uniquely identifying information of the entity.

FIG. 1 shows high level block diagram of an exemplary computing system according to embodiments of the present invention. A number of computing devices 10, 20, 30, 40 and 50 may be maintained, each by a different respective organization or institution 10'-50' (e.g. a financial institution, a bank, or another organization), and may be connected by one or more networks 55, e.g. the Internet. While five computing devices are shown, more computing devices and more organizations may be used. Each computing device may maintain and participate in a private (e.g. private to devices 10-50, or to the organizations or institutions 10'-50' maintaining devices 10-50) blockchain 60 (e.g. an instance of the Ethereum blockchain) to share information securely. (When used herein, a blockchain may refer to the system of data and cooperation implemented by blockchain technology, and also the specific data structure(s), e.g. blockchain 60, that implements such a system.) Thus a version of the data structure blockchain 60 may be stored at and maintained by each of computing devices 10-50. Devices 10-50 may be for example servers or larger computing systems including multiple computers or servers, and may have a structure such as described in FIG. 2.

A name service or index 70, e.g. the ENS, may be stored and maintained, e.g. in a distributed fashion by devices 10-50. At various points in time each of institutions 10'-50', via their respective computing devices 10-50 may, for example: act to publish information based on an alert to blockchain 60 (e.g. as contract owner computers, described herein as, e.g. performing operations 300-390); extract or download information (e.g. as a contract flattened code) created based on an alert from blockchain 60 and then, depending on the results of local processing, publish a proof based on an alert to blockchain 60; act as verifying nodes (e.g. as in operations 550 and 560 described below) that prove or verify proofs that are sent to the blockchain, to alert an institution publishing information based on an alert.

In some implementations, there is no single or definitive version of blockchain 60, and each node (e.g. of nodes 10-50, FIG. 1) keeps its own local copy of blockchain 60, and these local copies can vary from computer to computer at any given time. Each node may attempt to synchronize or update its local copy of blockchain 60.

Figure 2:
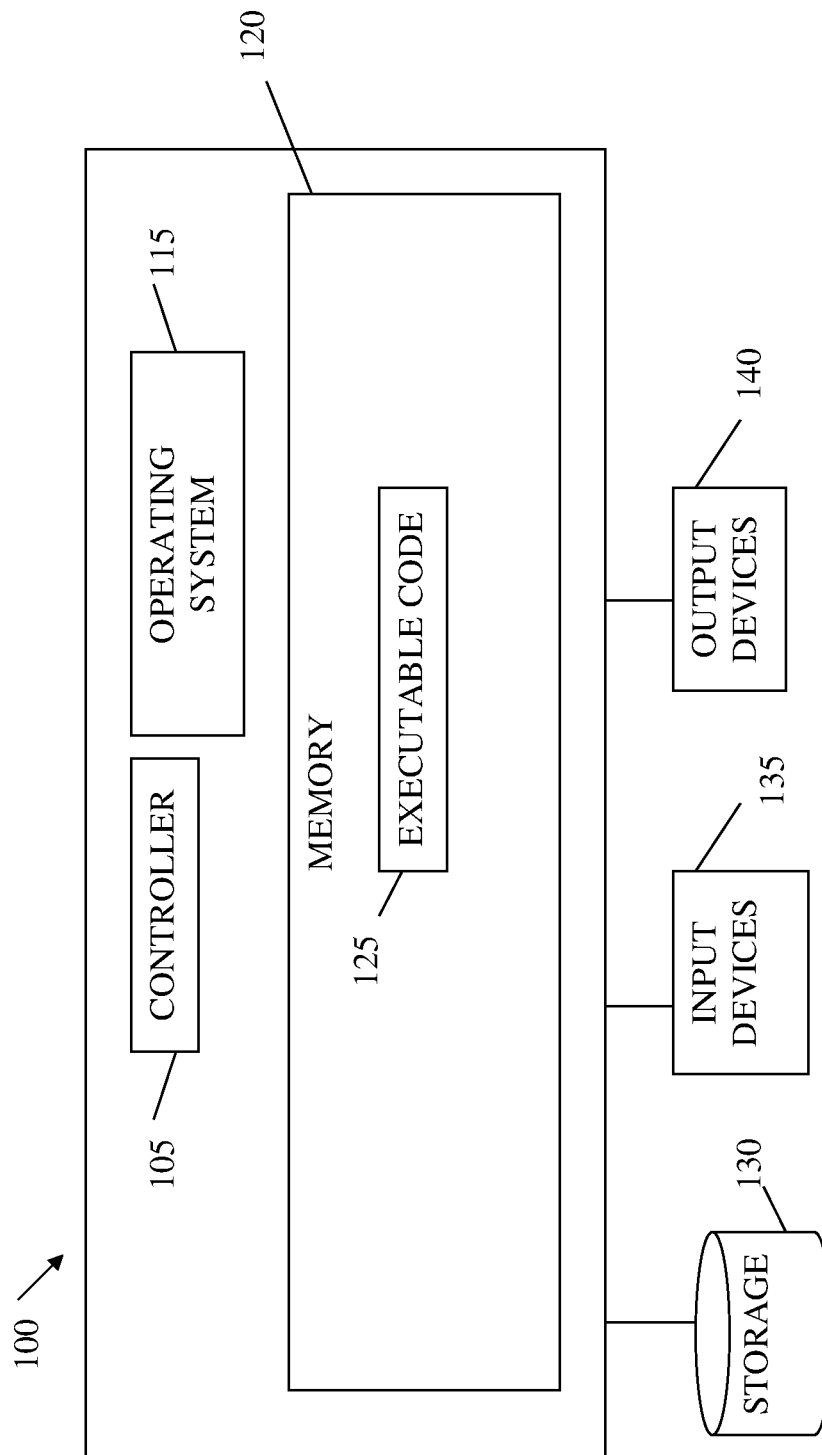
FIG. 2 shows a high-level block diagram of an exemplary computing device according to embodiments of the present invention.

Reference is made to FIG. 2, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of possibly different memory units. Memory 120 may be a computer or a processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to process alerts using a blockchain, as discussed herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as blockchain representations, alerts, etc. may be stored in storage system 130 and may be loaded from storage system 130 into memory 120 where it may be processed by controller 105. Some of the components shown in FIG. 2 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

Figure 3:
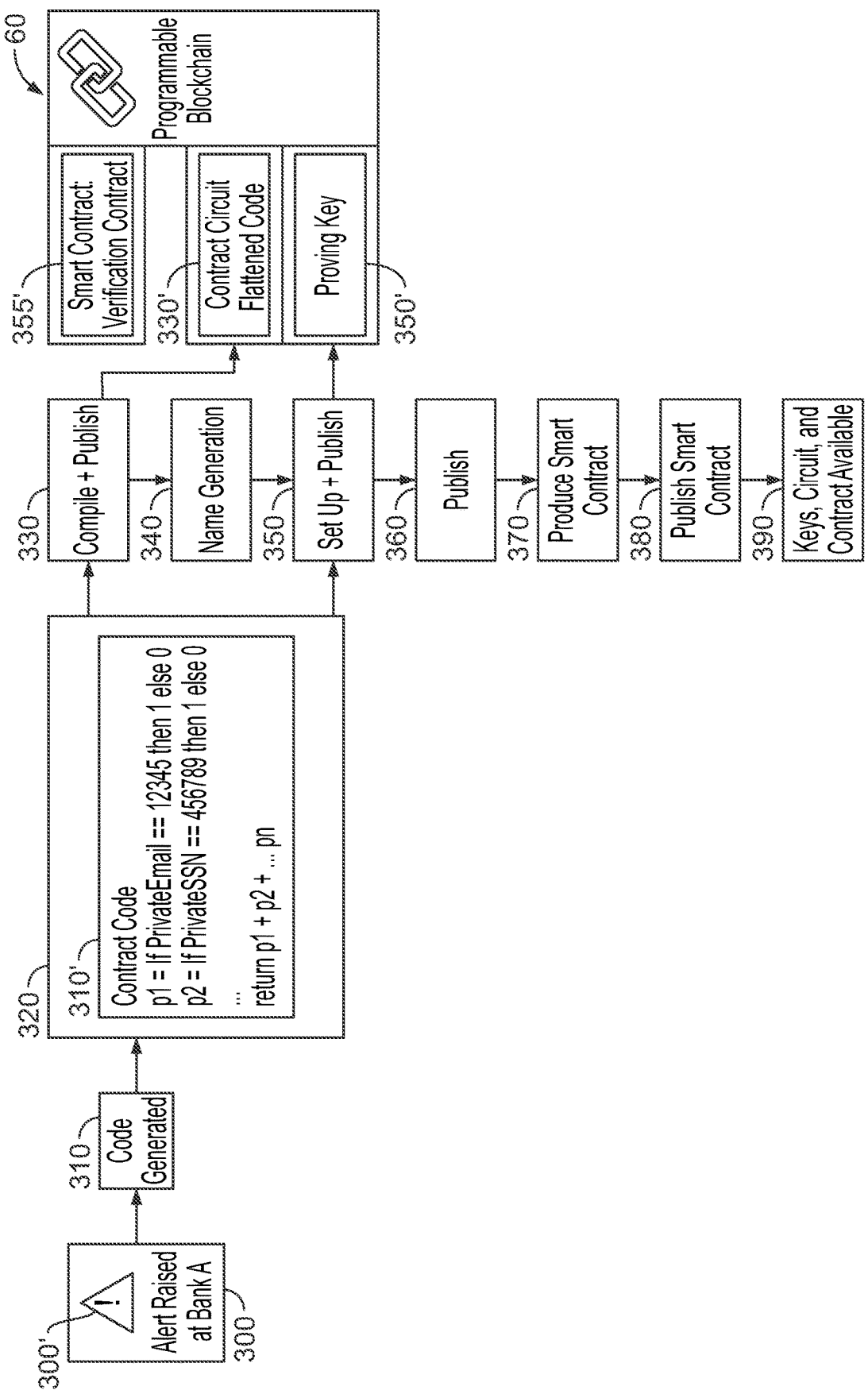
FIG. 3 shows a flowchart of a method according to embodiments of the present invention.

FIG. 3 shows a flowchart of a method according to embodiments of the present invention. Typically, the operations described in FIGS. 3-6 are performed by the computing systems 10-50 operated or controlled by the relevant institution or entity. At any time, any of computing systems 10-50 may operate to be: a computing system operated by an institution raising an alert and publishing a contract to a blockchain; a computing system operated by an institution to determine if an alert for an entity exists in a contract form on the blockchain; and a computing system acting as a verifying node to write or generate verification smart contracts.

In operation 300, an alert 300' may be raised at a first institution among 10'-50', e.g. automatically by respective processor among systems 10-50. For example, at a first bank or financial institution 10' (provided as an example, as other institutions among 10'-50' may raise alerts and publish code), also termed a "contract owner", suspicious activity may be found relating to or associated with an entity, person, account, or transaction, and an alert based on or associated with that person, account, or transaction may be created. The first institution (e.g. 10') may wish to securely share information regarding the alert without revealing that information. Alert 300' when discussed herein may be both the activity and knowledge of the specific alert and the data describing the alert, typically stored at a computer system 10-50.

In operation 310 code, software, code or instructions 310' may be generated (e.g. by the first institution or "contract owner" 10' via its computer system 10) which may for example take as input details or parameters of alert 300' (the parameters being e.g. suspected or proposed, to be checked against the actual details), or of the entity underlying the alert (e.g. birthday, social security number, ZIP code, account number, etc.). Code 310' may output a binary match, a binary yes/no indication that a certain number of input parameters match (e.g. are the same as) actual parameters of the alert or entity, or the number of matches between the input data or details and the actual (e.g. actually describing the underlying entity) details or parameters. Code 310' may also take as input a number of parameters that must match to return a "true" or "match" output. E.g. such code may take as input X different details and return whether or not the details as a group match the details of the alert or entity underlying the alert, or may output the number of details that matched. Code 310' may takes as input (e.g. to a function or application program interface (API) embodied by the code) details or information regarding an entity (e.g. information provided by a proving entity wishing to determine if details regarding an entity match the entity which underlies the code) and return a value true/false, 1/0, the number of information items matched, etc.) based on a match to actual details (e.g. the true birthdate, postal code, etc.) regarding the entity Code 310' may be created (e.g. by the contract owner computing system) using the ZoKrates toolbox, later converted to the Solidity language (e.g. by the same contract owner node), and then compiled by the contract owner node to bytecode suitable for execution on, in one implementation, the Ethereum Virtual Machine (VM). Other languages and systems may be used. The code may be generated based on the private identifying information of the entity in the alert, and may later be encrypted into a verifying contract. The code may compare, item by item, each input item, against corresponding (e.g. recorded in the code) actual details regarding the underlying entity, and for each positive match or equivalency, increase a count, or if only one item is compared, return true/1 if there is a match or equivalency, and false/0 if not.

In operation 320 any character strings in the code, such as names, may be converted (e.g. by the contract owner) to unique numeric values (unique in the sense they differ from the values of other strings), since typically zero knowledge proof systems can work much more efficiently on integer values.

Code 310' may be converted or compiled (e.g. by the first institution or "contract owner") prior to being output to or published to a blockchain. In operation 330 the code produced in operation 310 may be converted or compiled into a flattened circuit code 330'. In one implementation the flattened circuit may be an abstraction that is easily convertible into a rank-1 constraint system (R1CS) which may be compatible with zkSNARK proof systems. Such a flattened circuit 330' may be a blockchain contract written in human readable code, with strings converted into numbers, compiled into a more abstract set of code that which, provided with correct input may verify the input.

In one example embodiment, flattened code includes a list of variable definitions and assertions of the following form:
def(c_1*var_1+c_2*var_2+ . . . +c_n*var_n){=|==}
(a_1*var_1+a_2*var_2+ . . . +a_n*var_n)*(b_1*var_1+b_2*var_2+ . . . +b_n*var_n)
Where the left side is linear and the right side includes a multiplication of linear terms.

In operation 340, labels or names may be generated (e.g. by the first institution or "contract owner") for the various data items to be published to block chain 60, typically names that include or are based on some information describing the entity underlying the published data items or the alert (e.g. a person involved in a transaction). For example, a name may be generated for the code or flattened code based at least in part on information describing the underlying entity; and other data items published to the blockchain may also have names generated based in part on information describing the underlying entity. The name may be converted by a name service to an address for the data item on the blockchain.

Figure 5:
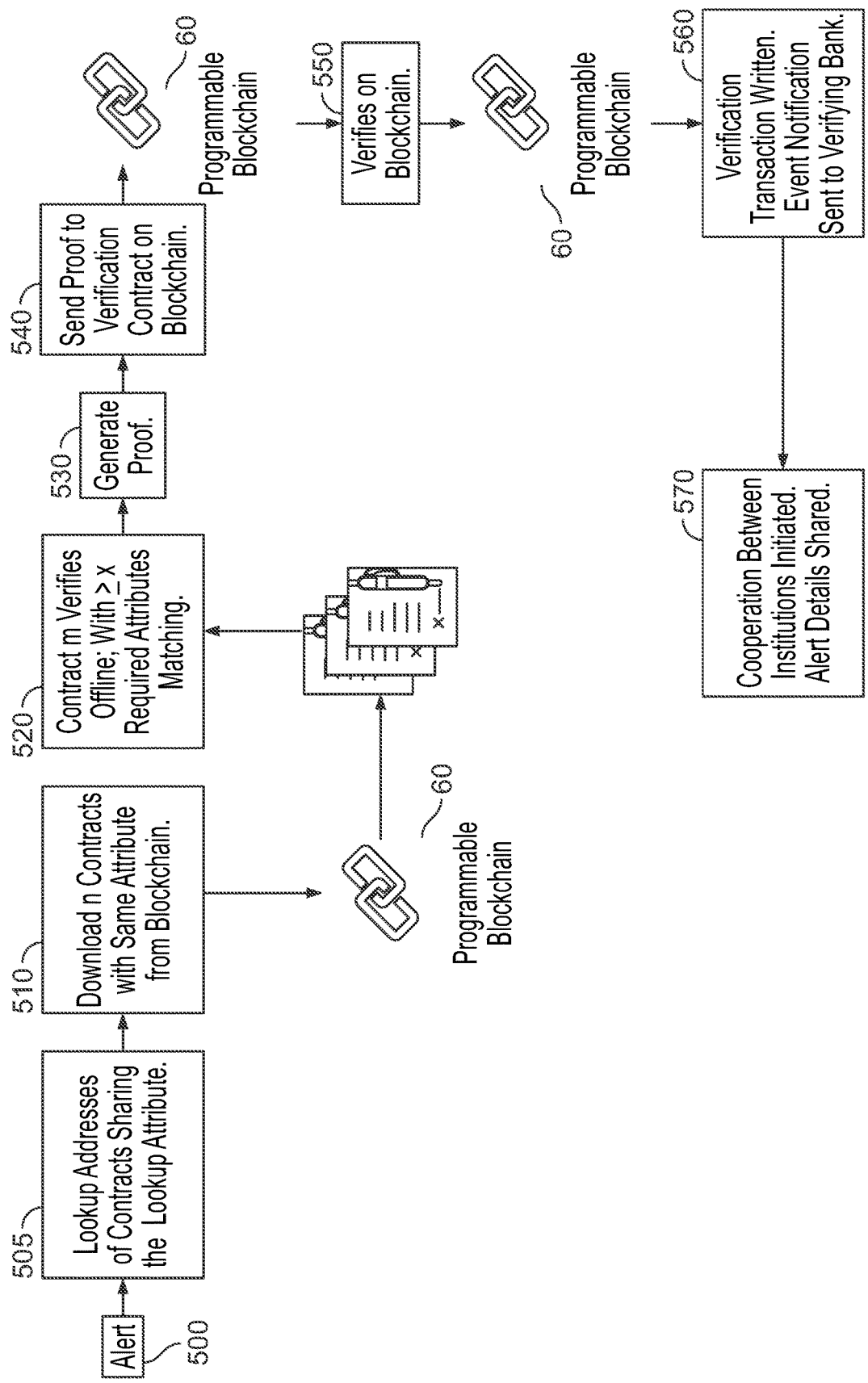
FIG. 5 shows a flowchart of a method according to embodiments of the present invention.

In operation 350 a setup stage may be executed to generate, typically by the first institution, one or more keys 350' used for verification and proving stages (see, e.g. FIG. 5). Keys 350' may be derived from the flattened code, or produced in other manners. The keys may correspond to the code published in operation 360 in the sense that the keys are created to be used with the code, and are stored on blockchain 60 with the code or share some name characteristics with the code.

The keys may be a pair of keys which may be a CRS (Common Reference String), which may be a pair of proving (typically long) and verification (typically shorter) keys. A CRS may be generated then split into a proving key and verification key. Each key may be a common string taken from a predetermined distribution. All entities participating in the blockchain may have access to common strings—the keys—chosen according to some predefined distribution. In one embodiment, based on the flattened code, the two public keys 350' are produced. Based on the verification key, a verification smart contract 355' may be generated which can then verify proofs on the blockchain. To generate a proof, a proving institution executes the flattened program (which may be considered equivalent to finding a solution to the flattened program via the "compute-witness" step). The proving institution then uses the proving key and the solution (e.g. by applying the proving key to a witness) to create a proof and sends it to the verification contract (e.g. sends to the blockchain so other nodes can execute it) to verify its correctness.

In operation 360 the code (possibly as a flattened code or compiled code version 330') and/or keys 350' may be published or sent by the first institution (e.g. "contract owner") to blockchain 60 for further use by a proving institution. In some embodiments flattened code 330' is published in the same data structure as the proving key corresponding to the code in the same data structure; in other embodiments such items may be published separately. The published flattened code or circuit may be suitable for executing locally at a proving institution, and is not typically executable on the block chain, but is rather stored as data. The flattened code may when executed provide an output of for example the number of matches, or a Y/N match, but typically cannot provide any actual identifying information.

Each item of information published to blockchain 60 may have a label or name generated for it based at least in part on information describing the entity without allowing for identification of the entity; for example information describing the entity such as a creation or birthdate may be used to create a name or part of the name. Other information, not associated with an entity, may be used to create such a name. The information describing the entity that is used for the name may overlap with or be the same as the information used as parameters for the match by the code, or may be different. For each name identifying an entity published to the blockchain, an entry may be created in an index or name service which converts the name to a blockchain address. The name may be used to index or find a location for the published information on the blockchain.

In operation 370 a smart contract 355' may be produced (e.g. by the contract owner) which includes no actual data that may be used to identify the underlying entity. For example, the verifying contract may be converted by the first institution to a blockchain compatible language (e.g. the Solidity language) and from there may be converted to bytecode (e.g. portable code or p-code). The resulting verifying code can then be executed by participating nodes on the blockchain. Based on a verification key, a verification smart contract or smart verification 355' may be generated, e.g. by the contract owner or first financial institution, from the flattened code 330', which can then verify proofs on the blockchain, authenticated with the proving key. It may be considered that the verification key is embedded in the smart executable contract 355' (or that the smart contract includes the verification key), and thus the verification key is published to the blockchain along with the smart contract. Typically, specific keys are generated for and correspond to specific contracts.

In operation 380 the smart contract 355' produced in operation 370 may be published by the first institution to block chain 60. In some embodiments the first institution or contract owner publishes two entities (possibly stored in different places on the blockchain, with different hash addresses, and different names corresponding to those hash addresses): a smart contract (including a verification key), and the flattened code and the proving key in the same data structure. Thus in some embodiments two names or lookup keys are created for the first institution's data created and published based on an alert.

In operation 390 the proving key, contract circuit and smart verification or verification smart contract may be available on blockchain 60.

When an institution described as a "contract owner" or "first institution" raises an alert and publishes information to a blockchain regarding that alert (e.g. operations 300-390), it may also search and download from the blockchain for information related to that alert published by other contract owners and create proofs (e.g. operations 500-540), and thus the contract owner institution may also act as a proving institution. In addition, when an institution first raises an alert internally, it may, before publishing a contract based on the alert, check the blockchains for alerts related to the same entity, and if found, opt to not publish a contract to the blockchain.

Figure 4:
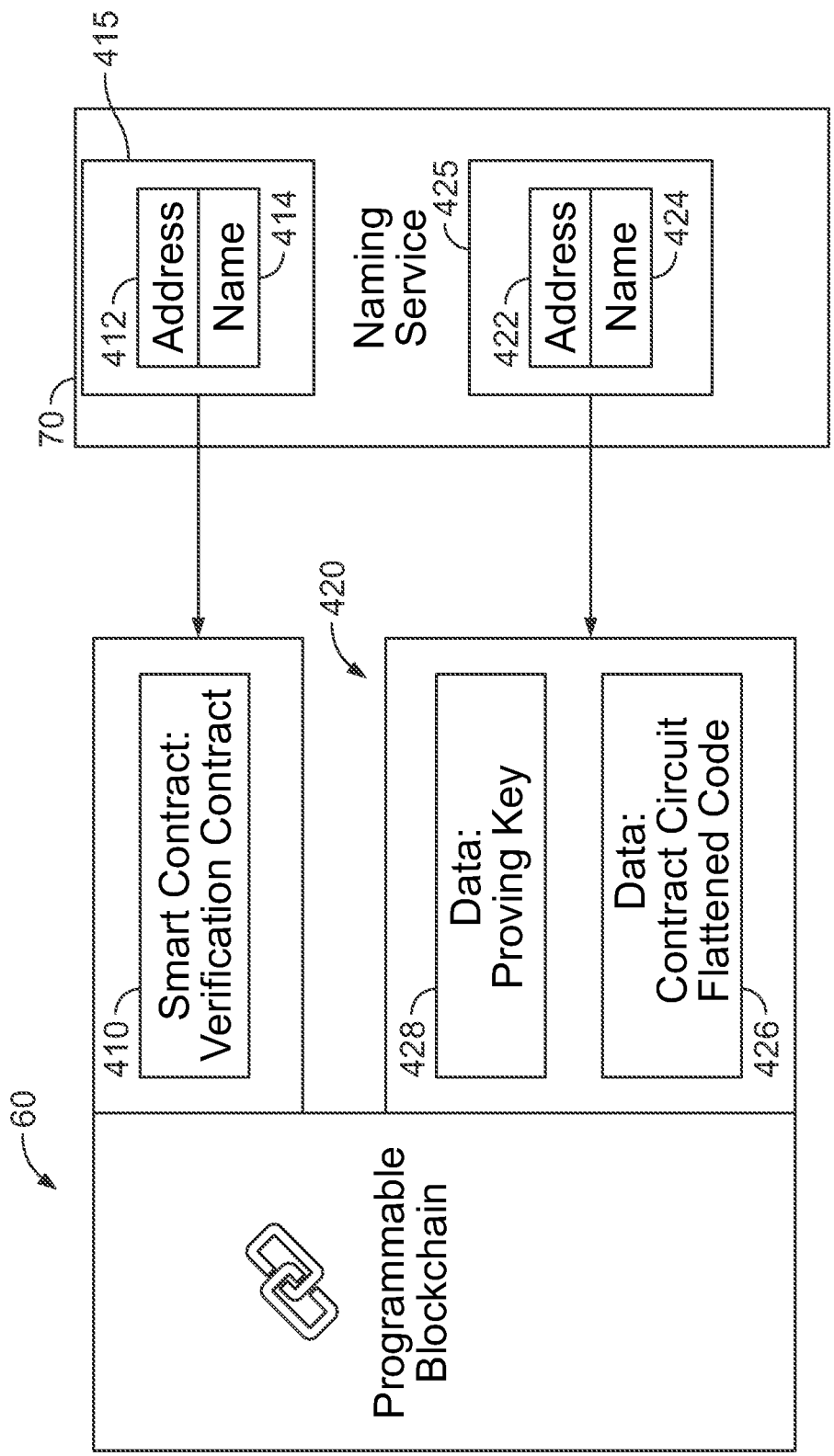
FIG. 4 is a diagram of data flows according to embodiments of the present invention.

FIG. 4 is a diagram of data flows according to embodiments of the present invention. While, when discussed herein, it may be phrased that an "institution" performs an action, as with other figures and actions described herein, an institution such as institutions 10'-50' performing an action typically means that a respective computer processor maintained by an institution (e.g. among systems 10-50 in FIG. 1) performs such actions.

Contracts and possibly other information such as keys (e.g. a proving key) may need to be located for use by for example proving institutions. A hash key or other type of addresses may be assigned by the blockchain or via name service 70, and such an address should be useable or discoverable. The institution or party publishing information to the blockchain may use or set up a name lookup system based on an agreed naming convention. For each name identifying an entity published to the blockchain, an entry may be created in an index or name service such as service 70 which converts the name to a blockchain address. Typically, the name allows a searching institution to find blockchain entries relevant to a specific underlying entity without revealing any identifying details regarding that entity, aside from general details such as a birthday or ZIP code which apply to many other entities. Typically, the information describing or associated with the entity used to form a name is different from and does not overlap with the parameters provided to the code to determine a match or used to form a witness or proof.

For example, the smart verification contract 410 on a blockchain 60 may receive or be assigned a blockchain address 412 of for example 0x9e08f4656e529 da61fc45de7cb77668709604fe82f66de12989aee79fe111-2dc. Other formats for addresses or locators may be used. The institution publishing information to the blockchain (e.g. operating one of computing devices 10-50) may add or create a record 415 which ties or links a name to an address 412 to a name service 70 or other database or lookup function, name 414 reflecting certain information associated with the entity underlying the contract (e.g. a person involved in a transaction) which typically is general enough to not reveal the identity of the entity, but which is specific enough to divide the contracts into manageable (e.g. relatively small) groups. In one embodiment this information is the date of birth or date of creation for the entity. Other associated information may be used.

Each item of information published to blockchain 60 (e.g. each of the code and keys, or other information such as proofs) may have a name generated for it based at least in part on the entity underlying the item of information. In some embodiments the first institution or contract owner publishes two entities (smart contract 410 including a verification key; and flattened code 426 and the proving key 428 in the same data structure 420), and thus in two names or lookup keys 414 and 424 are created for the first institution's data created and published based on an alert. Names may also be created for data published by a proving ("second") institution.

For example, associated information or attributes of an entity—e.g. date of birth, encoded for example with a prefix as verify19700101_101—may point to or be associated with by a database or name service 70 to the contract addresses 412 and 422. A contract address may be in the form of for example a hash (e.g. 0x9e08f4656e529da61f c45de7cb77668709604fe82f66de12989aee79fe1112dc), or another format. Other names derived from information which describes but cannot effectively identify an entity may be used, such as the first initial of a name (e.g. Acme Corporation founded on Jan. 1, 1970 may be stored as 19700101A1, the last digit denoting the first name describing such an entity). In some embodiments such a name may include an ordered integer N describing that the name describes the Nth entity having details used for the name to be described on the blockchain, such that the name 19700101An describes the n'th entity having a birth or creation date of Jan. 1, 1970 and a name starting with A to be stored. Names for related or associated entities—e.g. contracts, keys, and proofs all created based on the same alert—may share some information such as information derived from the alert (e.g. the date of birth of the entity underlying the alert) and may be differentiated by for example an addition or prefix to the name, such as "contract", "verify", etc. Thus, the same date, postal code, etc., may be used to find the smart contract and the flattened code.

The publishing institution may publish the original contract circuit or flattened code 426 used to create the verifier to blockchain 60, which may be used by the prover (e.g. the second institution such as institution 20' in one example) to create a proof against. In one embodiment, there may be two elements in a contract circuit data package 420 published to the blockchain: a contract 426, containing the contract circuit for use later to generate a proof by the proving party; and proving key 428 corresponding to contract 426, created as part of the setup stage. The data package 420 including proving key 428 may have an address hash 422 such as 0x9e08f4656e529da61fc45de7cb77668709604fe82f66de 12989aee79fe1112dd (other formats may be used). Name 424 and address 422 may be linked or associated within record 425. The key 428 may be found using the name service 70. Records containing names 412 and 414 may be added to the name service for this original circuit data 426. In some embodiments, two entities are published by a first institution or contract owner publishing information regarding an alert: a smart contract including a verification key; and separately a flattened code in the same data structure as a proving key.

A name 424 for a circuit or for the data structure on the blockchain containing the circuit may have, for example three parts, a prefix such as "circuit" and two other parts which are shared with or common to related data stored on the blockchain such as a date and an ordered sequential integer n indicating that this is the nth entity of a sequence of similarly named entries previously placed on the blockchain. For example, the name circuit19700101_101 may indicate the first circuit where the underlying entity has a birth or creation date of Jan. 1, 1970. A suffix or additional part ("_101" in this case) may be added to indicate the cardinal ordering of this name among names having the same derived information, in order to ensure each name used is unique within a private blockchain or private system or blockchain based alert sharing.

After information is published to or added to a blockchain based on an alert from a first institution, a second institution may want to review the blockchain to determine if an entity, person or transaction handled by the second institution is the subject of an alert on the blockchain.

A unique (e.g. unique within a particular blockchain implementation shared privately by a group of nodes) name for each contract and data block added to the blockchain may be created, for example using a simple convention based algorithm and/or a name based on attributes of the contract, blockchain entry, or entity underlying the entry or contract. In one example implementation a date of birth or date of creation (for a non-person entity such as a corporation) may be used as the main attribute for cataloguing records and creating names; however, any suitable combination of attributes with high enough unity may be used. Typically, the unique name is indexed to a name or identifier used by a blockchain, which is typically less human-readable than the unique name created based on attributes of the underlying entity or the contract.

Names or search keys generated for entities (e.g. code, data entities holding code, keys, etc.) published to a blockchain may include various pieces of information enabling ease of search but also preventing the underlying entity from being identified. For example, a token or tag (e.g. used as a prefix) identifying the type of entity published to the blockchain may be combined in a name with some information describing the entity (e.g. the person making the transaction) underlying the entity published to the blockchain. In one embodiment, each record for an entity published to a blockchain such as a verification smart contract may have a name having parts: a code or token identifying the type of blockchain entry (e.g. a verification contract), a date of creation or birth of the entity on which the alert is based, and a number relative to other blockchain entities. For example, one example name may be [verify][19700101][_18], where "verify" indicates that the blockchain entity is a verification contract, "19700101" represents the date of birth of the underlying entity (Jan. 1, 1970), and "_18" represents that there were 17 previous contracts on the blockchain for people or entities with this date of birth. In order to ascertain that this is number 18 it may be necessary to extract (e.g. from the blockchain) the number of existing contracts with the same attribute. Other name formats may be used.

A naming convention used to locate data blocks such as a single data block including flattened code or contract circuit a proving key may also have three parts, so that apart from the prefix all parts for data entities related to a specific alert are shared among the associated data blocks. A data item including the circuit corresponding to the same underlying alert as the verification smart contract named verify19700101_18 may have prefix "circuit" and be named circuit19700101_18. Similarly, if a proving key is saved or published to the blockchain on its own, separate from flattened code, it may include a prefix "key" and share other name information with entities based on the same underlying alert, and thus a key corresponding to circuit circuit19700101_18 may be named key19700101_18. Other prefixes than the examples of "circuit", "verify" and "key" may be used, and such identifiers need not be as a prefix. Different naming conventions may be used. For example, a name or token describing the type of entity, e.g. verify or key, may be a suffix instead of a prefix.

Typically, entities stored to a blockchain related as being based on the same associated underlying entity may be stored in different places on the blockchain, but need not be.

FIG. 5 shows a flowchart of a method according to embodiments of the present invention.

In operation 500 an "institution B" (e.g. institution 20' in FIG. 1 acting as a proving institution; other institutions among 10'-50' may raise alerts and generate proofs) may raise an alert regarding entity X at that institution, based on for example suspicious activity, and may wish to prove to other institutions knowledge of entity X without revealing that knowledge, or the identity of entity X.

Institution B may wish to check if entity X has an existing alert with other institutions, using blockchain 60. Institution 20' (via its computing system 20) may first search, operation 505, for published code possibly relevant to the entity X or the alert, and may for example use a name service 70 or other lookup system to convert information or attributes associated with or describing the entity underlying the alert, such as the birth date of the person underlying the alert, to one or more addresses of all available contracts for entities that share the same attribute(s) (e.g. having the same birth date). When an institution described as a "contract owner" publishes smart contract and key information to a blockchain regarding an alert (e.g. operations 300-390), it may also download from the blockchain information related to the party or institution underlying that alert which has been published by other contract owners and, if matches are found, create proofs (e.g. operations 500-540), and thus the contract owner institution may also be considered a proving institution.

The proving institution may receive or download, e.g. to a local computer (e.g. of computing devices 10-50) operated by the proving institution, from the blockchain, the published code (e.g. flattened code, compiled code, or contract circuit flattened code) corresponding to details for the second entity (which is suspected to be the same as a first entity for which an alert was raised by a different institution, e.g. as in operation 300). For example, the proving institution may download, operation 510 to a storage local to the institution on a relevant device among computers 10-50 all contracts or code conforming or corresponding to the details, information or attributes describing the entity. The details typically do not realistically reveal the identity of the entity (e.g. the details may be the date of birth of the entity, and may be formed into a name pattern circuit19700101_ppp where ppp is the cardinal ordering of names, or the number of contracts available).

The proving institution may execute on its local computer the published code that was downloaded, for example by using or providing as input parameters or details describing the suspected entity (e.g. a second entity suspected to be the same entity for which an alert is raised in operation 300). The downloaded published code or flattened circuit may be executed locally by a downloading node (e.g. of computers 10-50) but is typically not in blockchain (e.g. Ethereum VM) compatible format, nor does it typically have a verification key. Typically, the details used to search for published code and which form names for contracts are different from those provided as parameters to code to determine if matches exist. Typically, the parameters or information provided as parameters to code to determine if matches exist are the same as those used to create witnesses and proof.

Multiple such code segments or contract circuits may be downloaded and executed, since multiple such code segments may match via a name search the details describing the suspected entity (e.g. entities may share birthdays). For example, the proving institution (typically the institution's server or computing system) may check, operation 520, "offline" (e.g. not using the cooperative network of blockchain nodes, but rather locally at a computing system maintained by the institution) to see if or how many details for the underlying entity X match each downloaded flattened contract, by executing the code. The institution may execute, using a processor, each downloaded contract, providing one or more items of identifying information associated with the underlying entity (e.g. name, ZIP or postal code, account number, social security or government identification number, etc.) as input to the contract, and the contract may indicate or output if there is a match according to an input number of items to be matched (e.g. did four items match when four is input); or the number of items that match the actual corresponding items associated with the entity underlying the contract. A contract may output true or false indicating if there was a match or no match.

For a contract that indicates a positive match, a witness and proof may be generated, for example using the flattened code of the contract, in combination with a valid range of valid outputs. In one embodiment, before a proof attesting to correct execution of a contract is generated, the contract first is executed by the proving institution's computer. This may include finding a satisfying variable assignment for a flattened program, the variable assignment being referred to as a witness, and thus the witness may be considered input that satisfies the contract. The witness can then be used during proof generation, e.g. by applying a proving key to a witness to generate the proof. A witness for a given program can be found using, for example, a witness generator which acts as an interpreter for flattened code, and which may take a program's private inputs as parameters, execute the flattened code and store all variable values, thus finding a witness in the process. The witness may also be considered to be the correct inputs that satisfy the flattened code. The proof generated by the proving institution may be the witness encrypted by the proving key.

A proving computer may execute code which takes as input one or more parameters or details regarding an entity, and possibly the number of details to match to return true or false. The code may indicate or return a value (e.g. match/no match, true/false, or the number of parameters matched) based on a match to one or more actual details regarding the entity underlying the code. The following example pseudo-code may be used for offline (e.g. local at an institution) checking:

For each contract in contracts (the set of candidate contracts downloaded):
    for i in range(x, num_attributes): // range: minimum number of attributes for a match up up to all matching; precise match number needs to be provided.
        if compute_witness(X.attr1, . . . X.attr$_{num\_attributes}$, i):
            return contract Such code may return a value "true" or a positive match if the number of attributes needed for a match do match the actual parameters of the underlying entity, and a value "false" or a negative match otherwise; internally compute_witness returns true and false in the same manner. "return contract" indicates the code breaks from the loop with the current contract once a match is found. num_attributes may be the total number of attributes pertaining to entity X; x may be the maximum number of attributes needed to match. The range X.attr1, . . . X.attr$_{num\_attributes}$, i is from the minimum number of attributes for a match up until all matching attributes, provided for the precise match number. "compute_witness" may be a method of the zero-knowledge proof system executed by a processor, which accepts for example private parameters of the proof such as attributes describing entities, and the expected output (e.g. how many items match). Since the expected output can be in a range from the minimal threshold of matching attributes to all attributes matching, and the number of matching attributes typically is specified, the same contract may need to be processed multiple times, with varying expected outputs to allow for an allowed number of incorrect attributes. In one embodiment, flattened code may be constrained to return only whether or not there is a match to all, an input "expected output" number of, or a pre-determined and fixed number of input parameters (e.g. name, account number, geographic location, etc.). Thus, if it is desired that a match be positive if greater than a threshold number of parameters are matched, or that a number of matched integers is returned, the same flattened code segment may be executed a number of times, each execution returning true/match if a certain number (corresponding to an input such as x above) of parameters match, and from the output (e.g. 3 parameters match: false; 4 parameters match: true; 5 parameters match: false), an integer with the number of matches may be returned.

Thus for each alert n executions of contracts (where n=the number of entities that matched on the blockchain based on the parameters or details used to form the name) multiplied by the range of valid outputs may be needed: n×(num_attributes−x+1) where num_attributes is the total number of attributes pertaining to entity X; and x is the minimum number of attributes needed to match.

In operation 530, if the published code indicates or returns a match of the details for the second or suspected entity (or, e.g. an integer corresponding to a number of details that match which is higher than a threshold, which may allow for threshold or "fuzzy" matching), it may be determined that the second entity is the same as the entity for which an alert was previously raised and for which the code was created and published. In such a case a proof may be generated by the proving institution, based on code or contracts downloaded from the blockchain, and published to the blockchain. For example, for any contract that returned "true" or returned a threshold number for matching parameters in operation 520, the proving institution may generate a proof for example in the form of a witness and the proving key (e.g. by encoding the witness with the proving key, as in operations 660 and 670).

In operation 540 the proof is submitted or published by the proving institution to the verifying contract, e.g. it is sent to the blockchain.

In operation 550, the proof (already verified offline in operation 520) may verify on or via the blockchain, for example by a smart contract being executed by computing systems (e.g. among systems 10-50) being maintained by one or more nodes participating in the blockchain, which may be termed verifying nodes. The verified proof may correspond to the code or contract downloaded in operation 510 (e.g. the code or contract published in operation 360). The nodes of the blockchain may receive the proof to be verified via known blockchain methods. The proof generated by the proving institution may be entered as input to the contract, which when executed may return whether there is a match or not, or the number of matched items (e.g. the number of matches between details input to the code in operation 530 and actual entity details). If the proof published to the blockchain does not properly execute, according to the blockchain protocols, the proof is not verified, and lack of verification results in the first and second institution not sharing information (or not sharing information based on that specific contract).

While the code in operation 530 and the proof in operation 550 return a positive match (or the number of positive matches) if a detail input to the contract or code matches an actual detail of the underlying entity, the nature of the code and contract means that these details cannot be derived or decoded from the contract. The proof generated by the proving institution may be used by "third party" nodes (not the contract owner or prover), such that the third party nodes do not know or require the private information (e.g. name of the customer, ZIP code of the entity or customer, account number, etc.), which is required to create the proof. The private parameters of the proof may be generated cryptographically so they are meaningless to any node doing the processing.

In operation 560 if proof has verified in operation 560 (and not if it has not verified) a verification transaction may be written to the blockchain, typically verified by all participating nodes, and a notification event or message may be sent to the contract owner (the first institution, which published the contract to the blockchain). For example, the Ethereum system may tell (e.g. via a push notification) the contract owner that the contract was proven (including e.g. which contract) and also by which institution. The contract owner may use the identification of the contract to identify the alert and/or underlying institution of the alert.

In operation 570, as a result of proof verification, the first institution (e.g. contract owner) and second institution (e.g. proving institution) may carry on any cooperation, sharing alert details or information regarding the entity related to the alert (e.g. the person causing the alert), using agreed protocols and channels. For example, the contract owner may be notified of the identity of the proving institution and the entity underlying an alert raised by the contract owner via other nodes on the blockchain, based on known blockchain event notifications, and then either of the contract owner and proving institution may contact each other with the knowledge that the contract owner trusts that the proving institution has raised an alert or notification for the underlying entity.

Figure 6:
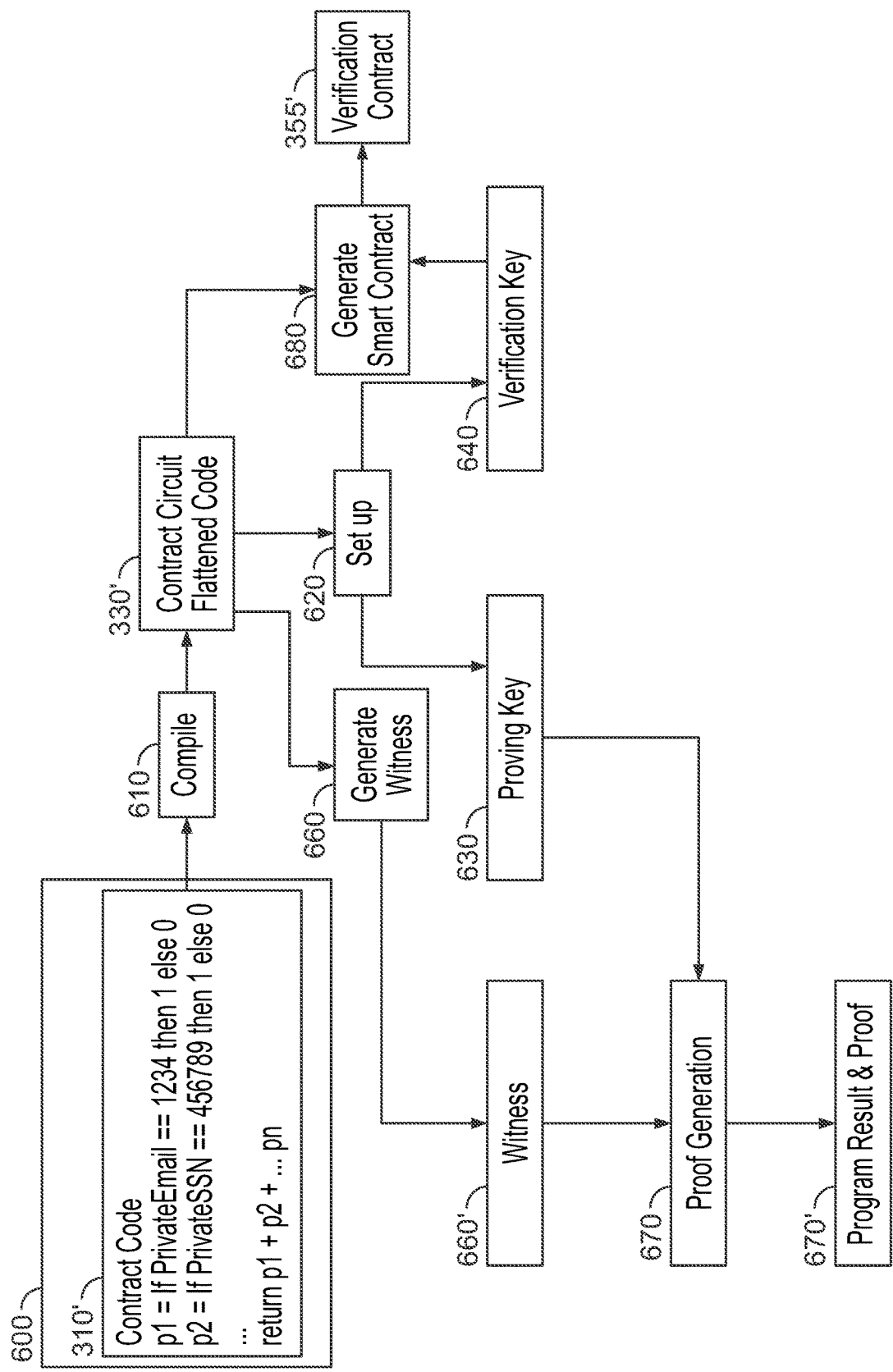
FIG. 6 shows a flowchart of a method according to embodiments of the present invention.

Various blockchain and/or zero-knowledge proof techniques may be used. FIG. 6 shows a flowchart of a one example zero-knowledge proof method according to embodiments of the present invention.

In operation 600, contract code or software may be created or written, typically by a bank (typically called the contract owner) raising an alert (e.g. by a computer system of a first institution in FIG. 1), in a simple high level language typically specific to the ZoKrates domain. Typically, simpler operations are more efficient for generating zero knowledge proof systems.

In operation 610, the code may be compiled by the contract owner to a more abstract flattened version 330'.

In operation 620, keys may be generated by the contract owner which may be unique to and/or correspond to each contract. A trusted setup may occur where a proving key (630) and verification key (640) being created by a first institution (e.g. operating a computer depicted in FIG. 1).

In operation 660, a witness 660' may be generated by a proving institution (e.g. operating a computer depicted in FIG. 1) based on the private and public parameters that satisfy or solve the contract, e.g. based in part on the flattened code and parameters applied to that code.

In operation 670, a proof 670' may be generated that can be verified against the verification smart contract. The proving key may be applied to a witness, and the result, e.g. program result and proof, is sent to the blockchain.

In operation 680, a verification smart contract may be written or generated, e.g. by contract owner institution, from the verification key and the flattened code. In one embodiment, to create verification contract, a verification key may be embedded in flattened code. Thus, flattened code may be used by a contract owner to generate a verification smart contract, and the same flattened code may be used by a proving institution to generate a witness and proof.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for securely sharing proof of knowledge of information without revealing the information, the method comprising:
   generating code which takes as input one or more details regarding an entity and returns a value based on a match to one or more actual details regarding the entity;
   generating a name for the code based at least in part on information describing the entity;
   publishing the code to a blockchain;
   publishing at least one key corresponding to the code to a blockchain;
   downloading to a computer from the blockchain published code corresponding to details for a second entity; and
   if the published code indicates a match of the details for the second entity, determining that the second entity is the same as the entity, generating a proof, and publishing the proof to the blockchain.

2. The method of claim 1 comprising compiling the code prior to publishing the code to the blockchain.

3. The method of claim 1 comprising for each name creating an entry in an index converting the name to a blockchain address.

4. The method of claim 1 wherein the entity is an entity associated with an alert generated by a financial institution.

5. The method of claim 1 comprising verifying a proof corresponding to the code via the blockchain.

6. The method of claim 1 wherein generating code is performed at a first institution and a proof is generated at a second institution, the method comprising, if a proof is verified, the first institution and the second institution sharing information regarding the entity.

7. The method of claim 1 wherein the computer is a local computer.

8. The method of claim 1 comprising executing on the computer the published code.

9. A method of proving knowledge of an entity, the method comprising:
   downloading to a computer from a blockchain published code corresponding to details for an entity; and
   if the published code indicates a match of the details for the entity, determining that the entity is the same as the entity for which the code was published, generating a proof, and publishing the proof to the blockchain.

10. The method of claim 9 comprising searching for the published code on the blockchain using a description of the entity.

11. The method of claim 9 wherein the computer is a local computer.

12. The method of claim 9 comprising executing on the computer the published code.

13. A system for securely sharing proof of knowledge of information without revealing the information, the system comprising:
   a memory; and
   a processor configured to:
      generate code which takes as input one or more details regarding an entity and returns a value based on a match to one or more actual details regarding the entity;
      generate a name for the code based at least in part on information describing the entity;
      publish the code to a blockchain;
      publish at least one key corresponding to the code to a blockchain;
      download to a computer from the blockchain published code corresponding to details for a second entity; and
      if the published code indicates a match of the details for the second entity, determine that the second entity is the same as the entity, generate a proof, and publish the proof to the blockchain.

14. The system of claim 13 wherein the processor is configured to compile the code prior to publishing the code to the blockchain.

15. The system of claim 13 wherein the processor is configured to for each name create an entry in an index converting the name to a blockchain address.

16. The system of claim 13 wherein the entity is an entity associated with an alert generated by a financial institution.

17. The system of claim 13 wherein the processor is configured to verify a proof corresponding to the code via the blockchain.

18. The system of claim 13 wherein generating code is performed at a first institution and a proof is generated at a second institution, wherein if a proof is verified, the first institution and the second institution share information regarding the entity.

19. The system of claim 13 wherein the computer is a local computer.

20. The system of claim 13 wherein the processor is configured to execute the published code.

21. A system for proving knowledge of an entity, the system comprising:
   a memory; and
   a processor configured to:
      download to a computer from a blockchain published code corresponding to details for an entity; and
      if the published code indicates a match of the details for the entity determine that the entity is the same as the entity for which the code was published, generate a proof, and publish the proof to the blockchain.

22. The system of claim 21 wherein the processor is configured to search for the published code on the blockchain using a description of the entity.

23. The system of claim 21 wherein the entity is an entity for which an alert has been raised, and wherein processor is configured to publish code related to the entity to the blockchain.

24. The system of claim 21 wherein the entity is an entity for which an alert has been raised, and wherein processor is configured to generate code which returns a value based on a match of input details to actual details regarding the entity.

25. The system of claim 21 wherein the computer is a local computer.

26. The system of claim 21 wherein the processor is configured to execute the published code.

* * * * *